United States Patent [19]
London et al.

[11] Patent Number: 6,076,097
[45] Date of Patent: Jun. 13, 2000

[54] SYSTEM AND METHOD FOR GENERATING RANDOM NUMBERS

[75] Inventors: Thomas Bennet London, Mountain View, Calif.; Karl Andres Siil, Princeton, N.J.; Sihai Xiao, Fremont, Calif.

[73] Assignee: AT&T Corp., New York, N.Y.

[21] Appl. No.: 08/988,781

[22] Filed: Dec. 11, 1997

[51] Int. Cl.[7] .................................................. G06F 1/02
[52] U.S. Cl. ................................................ 708/250; 380/46
[58] Field of Search ...................................... 708/250–256; 380/46

[56] References Cited

U.S. PATENT DOCUMENTS 5,251,165  10/1993  James, III ............................... 364/717

Primary Examiner—Tan V. Mai

[57] ABSTRACT

Random data is derived from the value of the elapsed time over which a loop is counted on a multitasking computer. The random data can be manipulated and whitened to produce random numbers of arbitrary length that pass both chi-squared and compression tests for randomness. The present invention does not rely on devices such as noise generators, leaky capacitors, gas discharge tubes, or keyboard strokes to generate random data, and reliably generates random data at a substantially higher rate than other systems and methods that can be implemented using only a general purpose computer executing instructions stored in computer readable memory. The present invention is advantageously portable among UNIX-based platforms, and operates without occupying UNIX timers or signals.

11 Claims, 2 Drawing Sheets

SYSTEM AND METHOD FOR GENERATING RANDOM NUMBERS

BACKGROUND OF THE INVENTION

The present invention relates to a system and method for generating random numbers. Random numbers play an important role in the use of pseudo random number generators, which are useful for cryptography and for various network security applications.

The quality of a pseudo random generator is based upon the unpredictability of its output. This unpredictability is in turn based partly upon the randomness of the numbers ("seeds") used to start the generator. The more random the seeds, the more unpredictable and better is the output of a well-designed pseudo random generator.

In practice, finding good random data for a seed can be problematic. It is difficult to generate numbers that are sufficiently random for most applications without resorting to hardware devices that rely upon natural phenomena with apparently random features. Such devices include physical noise generators, gas discharge tubes, and leaky capacitors. However, such devices are not generally suitable for use in a secure networking environment; it would be impractical (e.g., expensive) to require every node on a secure network that requires random numbers to have such a hardware device.

A known method of generating random numbers using the clock of a UNIX-based computer is called Truerand. Truerand obtains random numbers by counting a loop over a predetermined time supplied by a real time clock (ITIMER_REAL in a UNIX system). When the predetermined time expires, the computer generates an signal (using SIGALRM in a UNIX system) and the loop stops counting. The least significant bits of the loop count (i.e., the number of times the loop was counted) provides random data that is further manipulated to provide random numbers that pass several chi-squared tests for randomness.

The loop count randomly varies in its least significant bits from execution to execution of Truerand due to randomness in the way Truerand is executed on a timesharing system. As Truerand executes, it is swapped out so that another queued process can execute. When this occurs, the loop stops counting, but the clock in Truerand (e.g., ITIMER_REAL) continues to run while Truerand waits for its next slice of processor time. When Truerand is swapped in, the loop resumes counting. The loop stops counting after a predetermined elapsed time is reported from the computer clock (e.g., ITIMER_REAL), triggering an signal (SIGALRM). In this way, the loop count varies (particularly in the least significant bits, which change the most rapidly) with a randomness that corresponds to the random way in which the processor swaps in and out processes in a timesharing environment.

The randomness of the loop count is enhanced by granularity in the computer clock. That is, the way in which the elapsed time is reported from the computer clock (ITIMER_REAL) and triggers the signal varies from execution to execution of Truerand due to the changing state of the computer. This causes further unpredictable variations in the loop count, particularly in the least significant bits.

A disadvantage of Truerand is that it requires the use of the ITIMER_REAL timer and the SIGALRM signal when implemented in UNIX, one of the most commonly used timesharing operating systems. ITIMER_REAL or SIGALRM are reset each time either is used in a single UNIX application program. Hence, using ITIMER_REAL and SIGALRM for Truerand can substantially limit the functionality of an application in which Truerand occurs because the programmer is precluded from using either the timer or the signal elsewhere in the same program. This problem can be addressed by letting the parent process to fork a child process to execute Truerand, but this increases the complexity of the application and can introduce unacceptable delays, especially when Truerand has to be called frequently to supply random numbers. Another way to address the problem with respect to ITIMER_REAL is to save the timer value when calling Truerand and then reinstalling it when Truerand is finished executing. However, this introduces a substantial and unacceptable delay in execution while it is carried out.

Another disadvantage of Truerand is its slow speed. Truerand must run for a predetermined amount of time to obtain random data useful in constructing a random number. In a typical application with a 32-bit counter register (which contains the loop count), the least significant three bits from the register comprise the random data. Thus, to obtain enough random bits to form a 32-bit random number, the loop must be counted eleven times. In other words, the predetermined time for the loop must elapse eleven times to obtain sufficient random data to form a random 32-bit string, plus the time needed to swap in and out Truerand. Truerand generates only 25–30 bytes of random bits per second on a Sun Sparc-20 workstation. This is disadvantageously too slow for applications that require random numbers at rapid rates, such as generating a one-time pad, or frequently reseeding a pseudo random generator at a server.

SUMMARY OF THE INVENTION

The present invention provides a system and method for generating random data without using devices such as gas discharge tubes, leaky capacitors, noise generators or keyboard strokes, and without occupying UNIX timers and/or signals.

In accordance with the present invention, a loop count is selected and counted. Random data is taken from the least significant (the most active, and therefore the most random) bits of the value of the elapsed time over which the loop was counted. This is completely different from Truerand, which sets the duration for which the loop counts, and then derives random data from the number of times the loop is counted over that set duration. The present invention realizes a more efficient and quicker way of generating data that is at least as random as that generated by Truerand. The unpredictability of both the present invention and Truerand is based upon the UNIX scheduler and the granularity of the system clock. However, whereas Truerand generates between 25 and 30 bytes of random data per second on a Sun Sparc-20 workstation, the present invention generates around 2000 bytes of random data per second on the same platform. Data generated in accordance with the present invention has 10 passed chi-squared and compression tests for randomness.

The present invention advantageously use the standard UNIX system call gettimeofday to determine the elapsed time over which the loop is counted, while Truerand uses the ITIMER_REAL timer and SIGALRM signal. The use of the UNIX timer and signal precludes their use in the rest of the application in which Truerand occurs, disadvantageously preventing the programmer from easily and simply employing these useful UNIX features elsewhere in the application. The present invention advantageously allows the programmer to use the UNIX timer and signal elsewhere in the application.

The present invention provides a fast, efficient way to generate data proven to be random by chi-squared and compression tests. It does not rely on UNIX timers and signals, allowing these to be used elsewhere in the application that requires random data.

DETAILED DESCRIPTION

Figure 1:
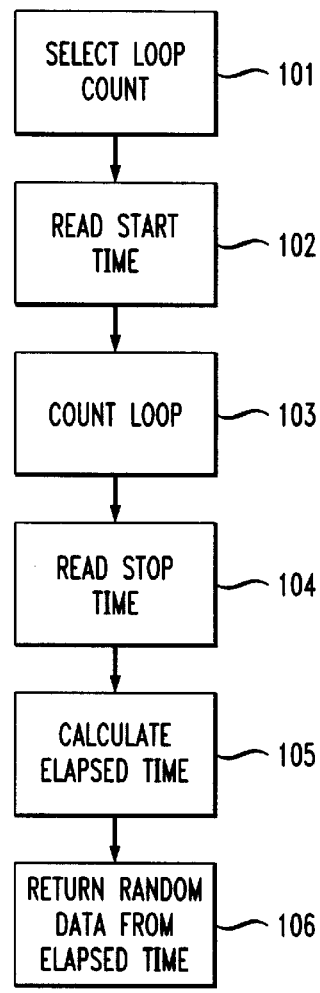
FIG. 1 shows one embodiment of the method in accordance with the present invention.

An embodiment of the method in accordance with the present invention is shown in FIG. 1. A loop count is first selected, step 101. In one embodiment, the loop count is selected from a list of random numbers. In another embodiment, the loop count is generated from a pseudo random generator. The loop count is advantageously sized to ensure at least one swap of the present invention as it executes on a timesharing processor. In other words, the loop count is selected so that it must be counted over more than one time slice for the processor. For example, for a Sparc-20 workstation, the initial loop count is selected to occur between 2000 and 3000.

After the initial loop count is selected, step 101, a computer clock is read to obtain a start time, step 102. The loop is then counted, step 103, and the computer clock is read to obtain a stop time, step 104. The elapsed time is then calculated, step 105, by subtracting the start time from the stop time. Random data is then taken from the register storing the elapsed time, step 106.

The present invention advantageously avoids relying on UNIX timers or signals to obtain random data, freeing such timers and signals for use elsewhere in the application program. In one embodiment, the present invention uses the gettimeofday command to obtain start and stop times from the clock. The gettimeofday command is advantageously available on almost any hardware platform implementing UNIX, rendering the present invention highly portable.

Figure 2:
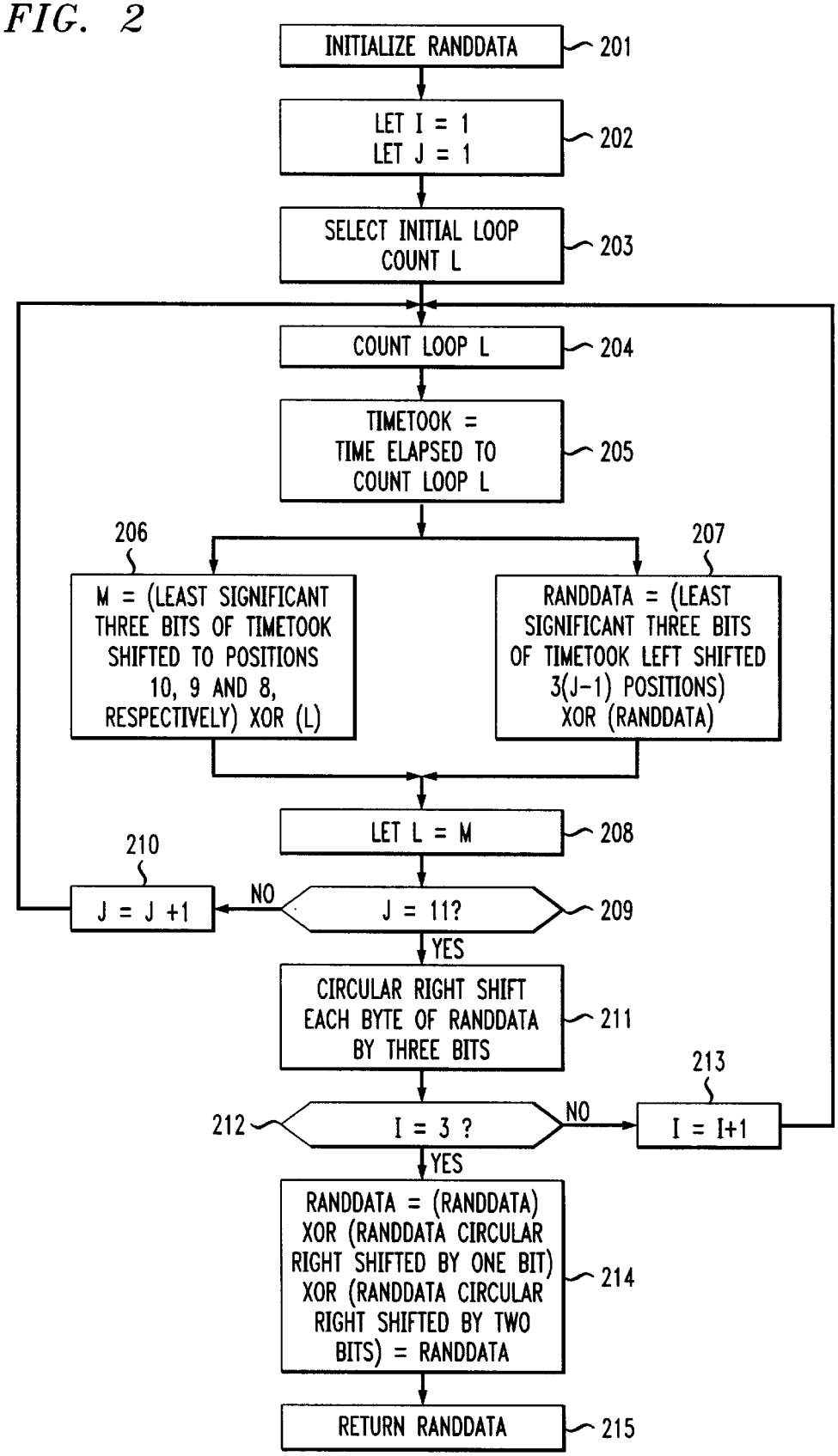
FIG. 2 shows an embodiment of a method in accordance with the present invention wherein random data derived from the value of the elapsed time for a loop count is manipulated to produce 32 bits of random data.

By using the time rather than the loop count as the source for random data, the present invention is much faster and more efficient than Truerand. It should be noted that the simple embodiment of the present invention shown in FIG. 1 only generates one or two random bits each time the loop is counted L times. Another embodiment of the method in accordance with the present invention is shown in FIG. 2. The embodiment shown in FIG. 2 advantageously produces a 32-bit random number using the basic idea shown in FIG. 1 (i.e., deriving random data from the elapsed time of a loop count) to produce random data. The embodiment shown in FIG. 2 is capable of producing about 2000 bytes of random data per second on a Sun Sparc-20 workstation, which is advantageously much faster than the 25–30 bytes of random data generated by Truerand on the same platform.

As shown in FIG. 2, a variable randdata is initialized, step 201, as are indices i and j, step 202. An initial loop count L is selected for the number of times the loop will be iterated, step 203. In one embodiment of the present invention, the initial loop count is selected from a list of random variables. In another embodiment, the initial loop count is generated from a pseudo random generator. The value of L should be sized such that a few least significant bits of the time value kept by the clock change from the time the loop starts counting to the time the loop finishes counting. In a Sun Sparc-20 workstation, L should be sized to range from about 2000 to about 3000.

The loop is then counted L times, step 204, and the time elapsed to carry out the count is stored in a time register as variable timetook, step 205. The least significant (and most rapidly changing, and hence most random) three bits of variable timetook are shifted into register positions 10, 9, and 8, respectively, exclusively ORed (XORed) with loop count L, and stored as variable M, step 206. The least significant bits of timetook are left shifted to affect the most significant bits of L in the XOR operation, which occur around positions 10, 9 and 8 because the value of L is around 2000–3000. The least significant three bits of variable timetook are left shifted 3(j−1) positions in a register and XORed with randdata, and the result is stored as randdata, step 207. Loop count L is set to be equal to variable M, step 208.

If j≦11, step 209, then j is incremented by 1, step 210, and the process is repeated beginning with step 204. If j=11, step 209, then randomness from timetook has been imparted to all 32 bits of randdata. Each byte of randdata is then circular right shifted by three bits, step 211. Step 211 advantageously further perturbs the contents of randdata. If is 3, step 212, then i is incremented by 1, step 213, and the process is repeated beginning with step 204. This moves every 3-bit of each byte of randdata from the least significant position to the most significant position once, advantageously further enhancing the randomness imparted to each bit of randdata.

If i=3, then randdata is XORed with randdata circular right-shifted by one bit, which in turn is XORed with randdata circular right shifted by two bits, step 214. The result is stored as randdata. Randdata is then returned then to the application as a 32 bit random number, step 215.

Step 214 advantageously reduces any bias of ones and zeros in randdata. If a random bit is biased toward 0 by a factor of $\epsilon$ then the probability of the occurrence of a 0 can be expressed as:

$$P(0)=0.5+\epsilon;$$

XORing two of these bits yields:

$$P(0)=(0.5+\epsilon)^2=(0.5-2\epsilon^2)=0.5+2\epsilon^2$$

By the same calculation, XORing three bits will yield:

$$P(0)=0.5+4\epsilon^3.$$

If $\epsilon$ is close to zero, then the bias is geometrically reduced with the number of XOR operations. In step 214 of the embodiment of the present invention shown in FIG. 2, each bit $y_i$ of randdata is the XOR of the corresponding bits $x_i$, $x_{i+1(mod\ 32)}$, and $x_{i+2(mod\ 32)}$, where $0\leq i\leq 31$. That is:

$$y_i=x_i+x_{i+1(mod\ 32)}+x_{i+2(mod\ 32)},$$

because each bit of randdata is generated randomly and hence independently. Step 214 thus ensures that bias $\epsilon$ is geometrically reduced in each bit of the output, advantageously enhancing the randomness of the output.

The present invention obtains the same level of randomness as the Truerand, since both are based on the same random sources, namely the UNIX scheduler and the granularity of the system clock.

A set of Chi-Squared tests shows that the present invention advantageously provides a satisfactory degree of randomness. The Chi-Square test ($x^2$ test) is said to be the best known of all statistical tests to examine a sequence generator.

A set of ten chi-square tests which test the randomness of a sequence generator from different perspectives is discussed in *The Art of Computer Programming, Vol 2: Seminumerical Algorithms*, by Donald E. Knuth, Addison-Wesley, 1982, 2d ed., pp. 39–71. The purpose of these tests is to provide quantitative measures for randomness. Empirical results show that almost all known good random number generators pass all of these tests while bad generators fail at least some of them. For example, a poor random generator such as a variant of the middle-square method has passed the frequency test, gap test, and poker test, yet flunked the serial test. Another poor random number generator using linear congruential sequences with small multipliers has passed many tests, yet failed on the run test because there are too few runs of length one.

In order to measure the randomness of the embodiment of the present invention shown in FIG. 2, the ten chi-square tests discussed in *The Art of Computer Programming, Vol 2: Seminumerical Algorithms* were applied over one hundred 100K-byte sequences generated by a software embodiment of the present invention. This software embodiment of the present invention, called "geo_rand" is as follows:

```
unsigned long
geo_rand( )      /*generate 4 bytes per geo_rand call*/
{
    int  i,j,k;
    unsigned long timetook, last3bits_time;
    unsigned long randdata;
    struct timeval tp;
    long start, end;
/*  Set the initial value for the loop bound by
gettimeofday. The initial */
/* bound is set to 1000≦ bound ≦ 4095 */
gettimeofday ( &tp, NULL );
static unsigned long bound =tp.tv_usec & Oxfff;
if(bound<1000)
    bound+=1000;
for (i=0; i<3;i++)
{
   for (k=0; k<11; k++) /*generate four byte */
      {
         gettimeofday ( &tp,NULL);
         start = tp.tv_usec;
         for (j=0; j<bound; j++)
         getimeofday (&tp,NULL);
         end = tp.tv_usec;
         timetook = end - start;
         if(timetook < 0)  /*this happens when time
             exceeds 1 sec */
             timetook = 1000000 + timetook;
             last3bits_time=timetook & 0&7;
/*Shift the last 3 bits of timetook to position 10, 9 and
8, respectively. */
/* This gives the most impact on the loop bound from the
most active 3 */
/* bits of timetook.                           */
    bound=bound^ (last3bits_time <<8)^timetook;
    if (bound >3000)
       bound=bound>>2;
    randdata=randdata^ (last3bits_time<<3*k);
    }
    randdata=cirRTShiftEach Byte (randdata,3);
  }
  return randdata^cirRTShift(randdata, 1)^cirRTShift
    (randdata,2);
}
unsigned long
cirRTShift (unsigned long d, int n)
                /* circular right shift d for n bits*/
{
    int i;
    for (i=0;i<n; i++)
        d=(d >>1)^ ((d & 0x1)<<31);
        return d;
}
```

-continued

```
unsigned long    /*circular right shift each byte of d
for n bits */
cirRTShiftEachByte (unsigned long d, int n)
{
   int i;
   unsigned long byte 1, byte2, byte3, byte4;
   byte1=d & Oxff;
   byte2=(d>>8) & Oxff;
   byte3=(d>>16) & Oxff;
   byte4=(d>>24) & Oxff;
for (i=0; i<n; i+++)
{
   byte1=(byte1 >>1)^((byte1 & Ox1) <<7);
   byte2=(byte2>>1)^((byte2 & Ox1)<<7);
   byte3=(byte3>>1)^((byte3 & Ox1)<<7);
   byte4=(byte4>>1)^((byte4 & Ox1)<<7);
}
return (byte4<<24)^(byte3<<16)^(byte2<<8)^byte1;
}
```

The above software generates four bytes of random data each time it is executed. Indices i, j and k are initially equal to zero. The initial loop count, variable "bound" in the above software, is derived from the time of the day at which the subroutine is called, advantageously introducing an element of randomness into the loop count. The time of day is obtained using the standard UNIX command gettimeofday, advantageously rendering the above code portable to practically any UNIX machine.

The loop is counted from zero to bound, using index j. For the purposes of this discussion, this is called the "looping step." The command gettimeofday is used to obtain the time elapsed in counting the loop. The elapsed time is stored in variable "timetook."

The least significant three bits of timetook, which are the most active (and so the most random) bits, are extracted and saved in variable last3bits_time. The last three bits are then shifted to positions 10, 9 and 8, respectively, and then XORed with the loop count "bound" and to obtain the new loop count "bound." Then, the least significant three bits are shifted three times k positions and XORed with randdata, to obtain a new randdata. Index k is incremented by 1 and this process is repeated until k is equal to 11.

When k is equal to 11, byte of randdata is circular right shifted by 3 bits. Index i is then incremented by 1, index k is reset to zero, and the process returns to the "looping step" described above, and is repeated. When i=3, randdata is XORed with randdata circular right shifted by one bit, the result of which is XORed with randdata circular right-shifted by two bits. The result is four bytes of randdata returned in accordance with the present invention.

The results of applying the ten chi-squared tests on a hundred 100K-byte sequences generated by the embodiment of the present invention on several different hardware platforms is shown in Tables 1–6:

TABLE 1

Chi-Square tests on a Sparc-20 heavily loaded server

| TEST | PASS % | AVERAGE CHI VALUE |
|---|---|---|
| Frequency Test | 98 | 14.1755 (dim 15) |
| Serial Test | 98 | 0.0812 (dim 255) |
| Poker Test | 99 | 3.9769 (dim 4) |
| Permutation Test | 98 | 5.0823 (dim 5) |
| Max-of-8 Test | 97 | 0.5075 (% Point) |
| Collision Test | 100 | 125.85 (dim 20) |
| Runs-up Test | 97 | 5.1208 (dim 6) |
| Serial Correlation Test | 96 | 0.0005 (n – 100000) |

TABLE 1-continued

Chi-Square tests on a Sparc-20 heavily loaded server

| TEST | PASS % | AVERAGE CHI VALUE |
|---|---|---|
| Gap Test | 97 | 7.9328 (dim 7) |
| Coupon Test | 100 | 11.1328 (dim 12) |

TABLE 2

Chi-Square tests on a Sparc-5 quiet local machine.

| TEST | PASS % | AVERAGE CHI VALUE |
|---|---|---|
| Frequency Test | 100 | 14.2670 (m 15) |
| Serial Test | 99 | −0.0817 (dim 255) |
| Poker Test | 98 | 3.9502 (dim 4) |
| Permutation Test | 99 | 5.1686 (dim 5) |
| Max-of-8 Test | 99 | 0.5556 (% Point) |
| Collision Test | 98 | 127.32 (dim 20) |
| Runs-up Test | 98 | 4.9368 (dim 6) |
| Serial Correlation Test | 96 | 0.0002 (n = 100000) |
| Gap Test | 100 | 7.8515 (dim 7) |
| Coupon Test | 99 | 11.8276 (dim 12) |

TABLE 3

Chi-Square tests on a SGI-IRIX 6.2 server machine

| TEST | PASS % | AVERAGE CHI VALUE |
|---|---|---|
| Frequency Test | 97 | 15.4670 (dim 15) |
| Serial Test | 97 | −0.0439 (dim 255) |
| Poker Test | 98 | 3.7673 (dim 4) |
| Permutation Test | 98 | 5.1022 (dim 5) |
| Max-of-8 Test | 97 | 0.5955 (% Point) |
| Collision Test | 99 | 126.03 (DIM 20) |
| Runs-up Test | 98 | 4.7674 (dim 4) |
| Serial Correlation Test | 97 | −0.0001 (n = 100000) |
| Gap Test | 98 | 7.8502 (dim 7) |
| Coupon Test | 98 | 11.1851 (dim 12) |

TABLE 4

Chi-Square tests on a SGI-IRIX 6.2 local machine.

| TEST | PASS % | AVERAGE CHI VALUE |
|---|---|---|
| Frequency Test | 99 | 15.4368 (dim 15) |
| Serial Test | 98 | −0.0048 (dim 255) |
| Poker Test | 99 | 3.5489 (dim 4) |
| Permutation Test | 100 | 5.2307 (dim 5) |
| Max-of-8 Test | 97 | 0.5236 (% Point) |
| Collision Test | 99 | 127.24 (dim 20) |
| Runs-up Test | 97 | 4.7674 (dim 6) |
| Serial Correlation Test | 98 | −0.0001 (n = 100000) |
| Gap Test | 96 | 7.6874 (dim 7) |
| Coupon Test | 100 | 12.2830 (dim 12) |

TABLE 5

Chi-Square tests on a HP-UX 9000 server machine

| TEST | PASS % | AVERAGE CHI VALUE |
|---|---|---|
| Frequency Test | 99 | 15.2230 (dim 15) |
| Serial Test | 97 | 0.0062 (dim 255) |
| Poker Test | 99 | 3.4460 (dim 4) |
| Permutation Test | 97 | 5.3486 (dim 5) |
| Max-of-8 Test | 97 | 0.5345 (% Point) |
| Collision Test | 98 | 127.25 (dim 20) |

TABLE 5-continued

Chi-Square tests on a HP-UX 9000 server machine

| TEST | PASS % | AVERAGE CHI VALUE |
|---|---|---|
| Runs-up Test | 98 | 4.6693 (dim 6) |
| Serial Correlation Test | 97 | 0.0001 (n = 100000) |
| Gap Test | 97 | 9.0313 (dim 7) |
| Coupon Test | 96 | 11.9543 (dim 12) |

TABLE 6

Chi-Square tests on a HP-UX 9000 local machine.

| TEST | PASS % | AVERAGE CHI VALUE |
|---|---|---|
| Frequency Test | 97 | 15.6389 (dim 15) |
| Serial Test | 97 | 0.0223 (dim 255) |
| Poker Test | 98 | 3.7225 (dim 4) |
| Permutation Test | 100 | 4.7091 (dim 5) |
| Max-of-8 Test | 97 | 0.5689 (% Point) |
| Collision Test | 96 | 127.84 (dim 20) |
| Runs-up Test | 98 | 4.9931 (dim 6) |
| Serial Correlation Test | 96 | −0.0002 (n = 100000) |
| Gap Test | 98 | 7.7388 (dim 7) |
| Coupon Test | 98 | 11.6248 (dim 12) |

For each platform, the random sequences are evaluated on both heavily loaded servers and quiet local machines. The "TEST" column indicates the name of the test that was carried out. The "PASS t" column indicates the percentage of 100K-byte sequences which fell between 0.1 and 0.9 in the chi-square distribution, which is generally accepted as indicating sufficient randomness in the tested sequence. The column "AVERAGE CHI VALUE" indicates the average chi value (and dimension) over all one hundred 100K-byte sequences. However, the averaged chi values for the max-of-8 test are presented in percentage form (the closer to 0.5, the more random the sequence); and the values for the serial correlation test are the serial correlation coefficients instead of the chi values.

Tables 1 and 2 show that almost all of the one hundred 100K-byte sequences produced by geo_rand in the test pass each individual chi-square test. Furthermore, the averaged chi value of each individual chi-square test was found to be uniformly distributed around 0.5 across the six testing environments shown in Tables 1 through 6. Thus, the present invention provides a significant degree of randomness.

From another point of view, the randomness of a sequence can also be tested through compression tests. As shown by U. M. Maurer in *A Universal Statistical Test for Random Bit Generators,* Journal of Cryptology, v.5, n.2, 1992, pp.86–106, if a sequence can be compressed then it is not truly random. To test the compressibility of sequences produced in accordance with the present invention, geo_rand was used to generate 100 100K-byte files on different UNIX platforms. A set of compression algorithms (pack and compress) were then applied to these files. The pack and compress commands are UNIX built-in compression utilities and using Huffman coding and Lempel-Ziv coding, respectively. The Huffman coding and Lempel-Ziv coding are usually very effective on text files, but are generally much less efficient on binary files because binary files have more randomness. None of the files generated by geo_rand was found to be compressible by any of these algorithms, further attesting to their randomness. Tables 7 and 8 show the results of attempting to compress the files on Sun workstations. The results on other platforms was similar.

The compressed file size and compression rate in Tables 7 and 8 are the average value over 100 100KB files. Note that the compressed sizes are all greater than 100K-byte, and that the compression rates are negative, indicating that the files actually became larger (rather than smaller) when acted upon by the compression algorithms.

TABLE 7

Compression test on a Sparc-20 server machine

| Test | File Size | Compressed Size | Compression Rate |
|---|---|---|---|
| Pack | 100 KB | 102,717 bytes | −0.30% |
| Compression | 100 KB | 139,059 bytes | −35.80% |

TABLE 8

Compression test on a Sparc-20 server machine

| Test | File Size | Compressed Size | Compression Rate |
|---|---|---|---|
| Pack | 100 KB | 102,717 bytes | −0.30% |
| Compression | 100 KB | 138,957 bytes | −35.50% |

Thus, the present invention is advantageously shown to generate random sequences by chi-square tests and the compression test. All of the testing results consistently showed a significant degree of randomness over different hardware platforms. The randomness of a sequence produced in accordance with the present invention may be enhanced by subjecting it to a good post-whitening function, such as SHA, DES or MD5.

The present invention is advantageously portable to all UNIX platforms using different hardware architectures, and advantageously does not use any UNIX timers or signals. Embodiments of the present invention have been executed on Sun Workstations, HP Workstations, and SGI Workstations without modifying a line of source code. The present invention also advantageously generates random data much faster than known methods of generating random data that are implemented in software. For example, geo_rand generates over 2000 bytes per second of random data, compared to 25–30 bytes per second for Truerand. According to the Internet Engineering Task Force document, *Internet Engineering Task Force Randomness Requirements for Security RFC*, dated Mar. 25, 1993, 25 bytes of random data should be adequate for seeding a pseudo random number generator. Based upon this requirement, geo_rand can feed over 80 pseudo random number generator calls per second. In real applications, a pseudo random number generator is not usually reseeded each time it is called. Rather, it is reseeded periodically. Assuming such a generator is reseeded every five times it is called, the geo_rand embodiment of the present invention can handle 400 calls per second, which is fast enough to handle most multi-user applications, even on the server side.

A computer program embodiment of the present invention can be distributed on computer readable medium, such as a floppy disk or a CD-ROM. Likewise, a computer program embodiment of the present invention may be stored on computer readable memory associated with a first computer on a network, and be delivered through the network to a second computer.

Figure 3:
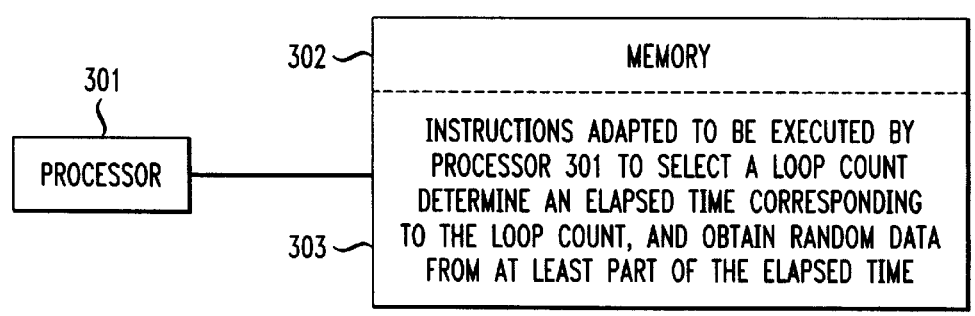
FIG. 3 shows an embodiment of an apparatus in accordance with the present invention.

An embodiment of an apparatus in accordance with the present invention is shown in FIG. 3. The apparatus is comprised of processor 301 and memory 302 that stores instructions 303 adapted to be executed by processor 301 to select a loop count, determine an elapsed time corresponding to the loop count, and obtain random data from at least part of the elapsed time. Memory 302 is coupled to processor 301.

In another embodiment (not shown) of an apparatus in accordance with the present invention, an Application Specific Integrated Circuit (ASIC) embodies instructions to select a loop count, determine an elapsed time corresponding to the loop count, and obtain random data from at least part of the elapsed time. The ASIC executes these instructions to produce random data in accordance with the present invention.

One embodiment of the apparatus in accordance with the present invention further comprises a port (not shown) adapted to be coupled to a network. The port is coupled to processor 301 and memory 302 (FIG. 3.)

The present invention is advantageously secure because of the complexity and unpredictability of the UNIX process scheduler (the means by which processor time is scheduled for an application), and the granularity of the computer or system clock. It provides a general, portable, reliable secure means for generating random data useful in a wide range of system applications.

What is claimed is:

1. A method for generating random data, comprising the steps of:
   a. selecting a loop count that defines the number of times a loop is to be executed;
   b. executing the loop a number of times equal to the loop count:
   c. determining the time that has elapsed while the loop was executed the number of times equal to the loop count, wherein the elapsed time is stored in memory as a number; and
   d. using at least part of the elapsed time number as random data.

2. The method of claim 1, wherein the loop count is selected from a list of random numbers.

3. The method of claim 1, wherein the loop count is provided by a pseudo random number generator.

4. The method of claim 1, wherein the loop count is sized such that the loop is counted during at least two time slices of processor time.

5. The method of claim 1, further comprising the steps of:
   d. using at least part of the elapsed time as random data by left shifting M the least significant bits of the elapsed time such that the magnitude of the resulting number is within a factor of two of the magnitude of the loop count of step a;
   e. XORing the shifted bits of the elapsed time with the loop count of step a and letting the result be equal to a new loop count;
   f. carrying out steps a through c using the new loop count as the loop count of step a.

6. The method of claim 1, wherein from one to five of the least significant bits of the elapsed time are used as random data.

7. A method for generating N bits of random data, comprising the steps of:
   a. setting indices i and j equal to 1;
   b. selecting an initial loop count L;
   c. reading a start time;
   d. counting a loop L times;
   e. reading a stop time;

f. calculating an elapsed time from the start time and the stop time;

g. shifting the M least significant bits of the elapsed time M(j−1) positions, where M is an integer;

h. XORing the shifted elapsed time with a variable randdata and letting the result be randdata;

i. selecting a new loop count;

j. if j is less than N/M, then incrementing j by 1 and proceeding to step c;

k. if j is equal to or greater than N/M, then circular right shifting each byte of randdata by 3 bits;

l. if i is not equal to three, then incrementing i by 1 and proceeding to step c;

m. if i is equal to 3, then XORing randdata with randdata circular right shifted by one bit, and XORing the result with randdata circular right shifted by two bits, and letting the result be randdata; and n. returning randdata as N bits of random data.

8. The method of claim 7, wherein selecting the new loop count in step i comprises the steps of:

a. left shifting the least significant Q bits of the elapsed time, Q being an integer, such that the magnitude of the resulting number is within a factor of two of the magnitude of the loop count of step a; and b. XORing the shifted bits of the elapsed time with the loop count of step a and letting the result be the new loop count.

9. An apparatus that generates random data, comprising:

a. a processor; and b. a memory that stores instructions adapted to be executed by said processor to select a loop count that is the total number of times a loop is to be executed by said processor, determine an elapsed time over which the loop is executed by said processor a number of times equal to the loop count, store the elapsed time as a number in said memory, and obtain random data from at least part of the elapsed time number, said processor coupled to said memory.

10. A system for generating random data, comprising:

a. means for selecting a loop count that is the number of times a loop is to be executed;

b. means for determining an elapsed time corresponding to the selected loop count;

c. means for storing the elapsed time as a number; and d. means for using at least part of the elapsed time number as random data.

11. A medium that stores instructions adapted to be executed by a processor to perform the steps of:

a. selecting a loop count that is the maximum number of times a loop is to be executed by a processor;

b. determining an elapsed time corresponding to the time that elapses when the loop is executed a loop count number of times by the processor;

c. storing the elapsed time as a number in memory; and d. using at least part of the elapsed time number as random data.

* * * * *